United States Patent [19]

Thornton-Trump

[11] Patent Number: 4,826,107

[45] Date of Patent: May 2, 1989

[54] AIRCRAFT DEICING UNIT HAVING RAPID HEATING CAPABILITY

[76] Inventor: Walter E. Thornton-Trump, 3342 Spanish Cove, Lillian, Ala. 36549

[21] Appl. No.: 37,881

[22] Filed: Apr. 13, 1987

[51] Int. Cl.⁴ .......................... B60P 3/30; B64D 15/00
[52] U.S. Cl. ................................ 244/134 R; 219/314; 122/408 R; 126/350 R
[58] Field of Search ....................... 244/134 R, 134 C; 122/37, 13, 408; 126/350 R; 219/314; 237/19

[56] References Cited

U.S. PATENT DOCUMENTS

| | | |
|---|---|---|
| 1,153,233 | 9/1915 | Knight . |
| 1,247,905 | 11/1917 | Troost . |
| 1,581,907 | 4/1926 | Barron .............................. 122/408 R |
| 1,767,122 | 6/1930 | Dean .................... 219/314 |
| 1,963,367 | 6/1934 | Ingison .................. 219/314 |
| 3,383,495 | 5/1968 | Laube et al. ......................... 219/314 |
| 4,032,090 | 6/1977 | Thornton-Trump . |
| 4,191,348 | 3/1980 | Holwerda ....................... 244/134 C |
| 4,242,569 | 12/1980 | Kayser .................... 219/314 |
| 4,438,728 | 3/1984 | Fracaro . |

Primary Examiner—Galen Barefoot
Attorney, Agent, or Firm—Welsh & Katz, Ltd.

[57] ABSTRACT

A method and apparatus for deicing aircraft wherein a deicing fluid tank is provided with partitions which establish a plurality of chambers for receiving a deicing fluid, such as water, and at least one chamber for receiving an anti-icing fluid, such as glycol. The fluid to be heated is withdrawn from a selected one of the fluid chambers, heated to a predetermined temperature such as 140°–190° F., and returned to the same chamber preparatory to application. The temperature of the fluid in adjacent chambers is raised somewhat by conduction. The various partitions provide limited flow communication between the fluid chambers such that as fluid is withdrawn from the selected primary chamber for application onto an aircraft, the fluid in adjacent chambers replenishes the removed fluid without substantially reducing the temperature of the fluid therein, thereby requiring minimal recovery time to maintain a temperature-ready supply of fluid for a deicing operation.

14 Claims, 2 Drawing Sheets

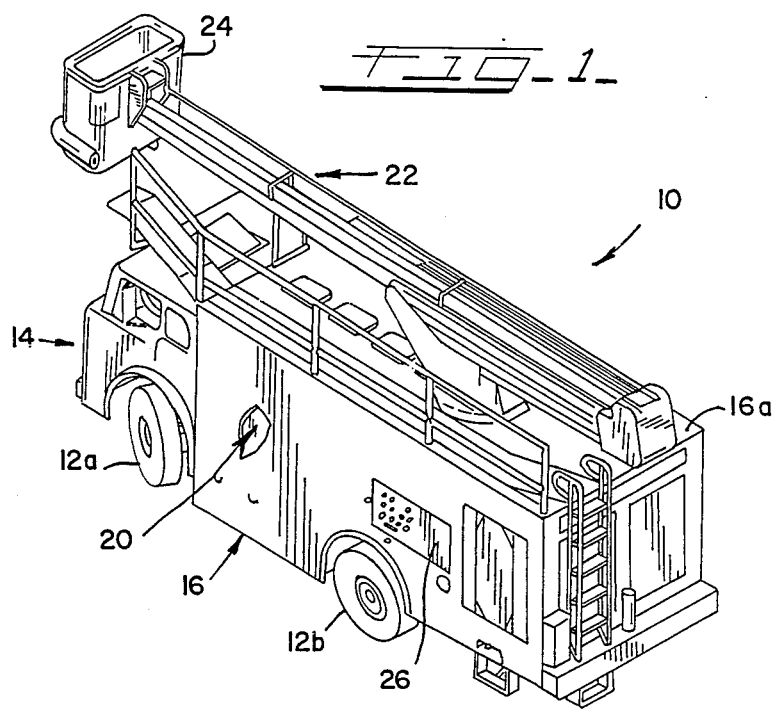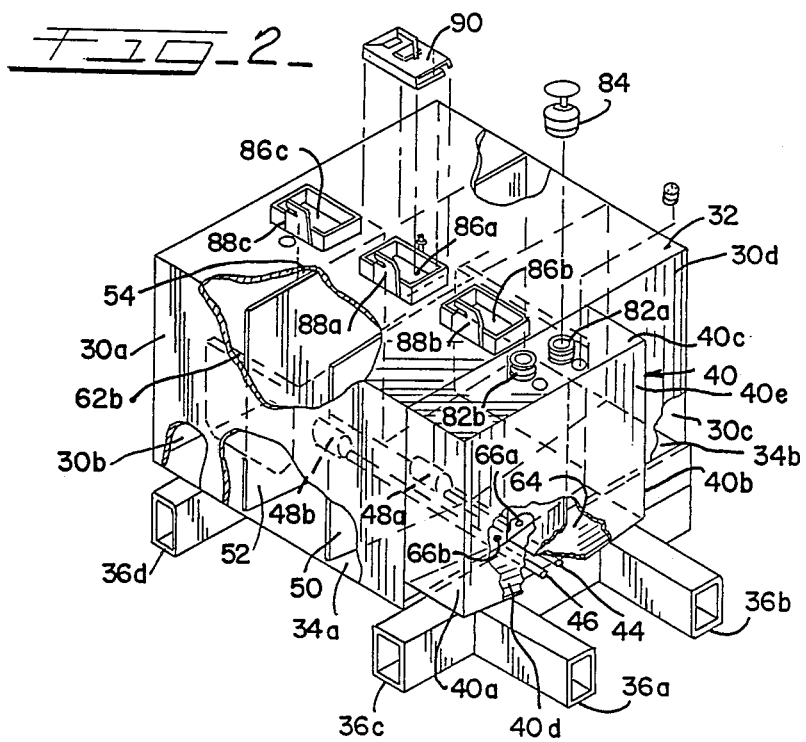

AIRCRAFT DEICING UNIT HAVING RAPID HEATING CAPABILITY

The present invention generally relates to a method and to equipment useful in removing ice and snow from an aircraft, i.e., deicing aircraft, and more particularly relates to such a method and deicing equipment that includes a heater for heating a deicing fluid that is directed onto an aircraft for purposes of deicing it.

There have been significant improvements in equipment used to remove ice and snow from the surfaces of aircraft over the years. This has been necessitated by the dramatic increase in size of commercial and military aircraft, i.e., the jumbo jets, as well as the increase in the cost of deicing fluids other than water, such as propylene glycol, for example. It is now widely recognized that the most effective means for removing ice and snow adhering to an aircraft is to direct a stream of heated fluid onto the aircraft to dislodge the ice from the aircraft. While the exact mechanism varies depending upon the atmospheric conditions that exist at the time, the heated fluid removes the ice and snow by a combination of melting, heating the aircraft surfaces sufficiently to break the bond between the ice and the aircraft, and to a lesser degree, by the force of the fluid striking the ice and snow.

It is generally accepted that the efficiency of the deicing process increases as the temperature of the deicing fluid is increased to the maximum allowable temperature that will not cause damage to the aircraft, which is generally considered to be about 180° to about 190° F.

Modern deicing units are often sophisticated self contained units which are built on a self propelled vehicle such as a truck, have several large capacity tanks, a boom having a basket for an operator, an auxiliary engine for powering the boom and a pump, a large capacity heater for heating the fluid in at least one of the tanks, and extensive controls, including sophisticated control circuitry for safely and effectively operating the unit.

It is, of course, extremely important for commercial airlines to maintain flight schedules and for military aircraft to be able to fulfill their missions. This is often difficult when icy and snowy conditions exist. It is therefore important that deicing units operate effectively and efficiently One of the most important considerations is to rapidly heat the deicing fluid that is onboard the deicing units, and to heat new fluid as onboard fluid is depleted during use. While present day deicing units have large capacity heaters that may exceed 2 million Btu's, because of the large tanks that are provided on such units, i.e., 1800 gallons or more, the time required to heat the fluid to about 180° F. can still often approach or exceed 25 minutes. It is extremely desireable to minimize the time required to initially heat the deicing fluid to its optimum temperature, and to heat additional fluid that may be needed to carry out deicing operations.

Accordingly, it is a primary object of the present invention to provide an improved method and deicing unit that can initially heat deicing fluid to its optimum temperature for removing ice and snow from an aircraft, and can also supply additional heated fluid in a relatively short time.

It is another object of the present invention to provide a method and deicing unit of the foregoing type that achieves rapid and effective heating of the deicing fluid without the use of larger heaters than are commonly used. Stated in other words, it is an object of the present invention to provide deicing fluid that is heated to its optimum temperature for use in a short time, and to do so using heaters that have no greater capacity than have been previously used.

A more detailed object of the present invention is to provide an improved method and deicing unit that achieves rapid heating of a portion of the deicing fluid that is on board the deicing unit and is capable of deicing with the heated fluid, and thereafter heat the remainder of the fluid in sufficient time to enable effective deicing without delay, i.e., without the necessity of waiting for the deicing fluid to heat after a deicing operation has been started.

Yet another detailed object of the present invention is to provide such an improved deicing unit which is conveniently designed so that the tanks that hold the deicing fluid are partitioned into chambers that are in fluid communication with one another, with one of the chambers being connected to the inlet and outlet of the tank and being connected to the heater for heating the fluid. By circulating the fluid from one partitioned chamber through the heater, the temperature of the fluid in that chamber can be rapidly brought up to optimum temperature.

Another object of the present invention is to provide an improved method and apparatus relating to deicing aircraft which employ a novel deicer fluid reservoir defining a plurality of discrete chambers for fluid, and wherein a selected one of the chambers serves as a primary deicer fluid chamber in which the deicing fluid is rapidly heated to a predetermined deicing temperature preparatory to withdrawal for application onto an aircraft, the withdrawn heated deicing fluid being substantially replenished with deicing fluid from adjacent chambers as the supply from the primary chamber is depleted.

A more particular object of the present invention is to provide a novel method and apparatus for deicing aircraft wherein a deicing fluid tank is provided with partitions which establish a plurality of chambers for receiving a deicing fluid, such as water or a mixture of glycol and water, and wherein the fluid to be heated for deicing is withdrawn from a selected one of the fluid chambers, heated to a predetermined temperature within the range of about 140° to about 190° F., and returned to the same chamber preparatory to deicing. The various partitions have apertures which provide limited flow communication between the fluid chambers such that as fluid is withdrawn from the selected primary chamber for application onto an aircraft, the fluid in adjacent chambers substantially replenishes the withdrawn fluid without substantially reducing the temperature of the fluid in the primary chamber, thereby requiring minimal recovery time to maintain a supply of fluid at the predetermined temperature for a deicing operation.

Still another object of the present invention involves providing such an improved method and deicing unit, while utilizing a design that straightforward and reliable, and requires no complex components, and yet achieves its intended purpose.

Other objects and advantages will become apparent upon reading the following detailed description, while referring to the attached drawings, wherein like reference numerals designate like elements throughout the several views, and in which:

FIG. 1 is a perspective view of a mobile deicing vehicle having a deicing fluid tank or reservoir constructed in accordance with the present invention;

FIG. 2 is a fragmentary perspective view of the deicing fluid tank employed in the deicing vehicle of FIG. 1, portions being broken away for purposes of clarity;

DETAILED DESCRIPTION

Figure 3:
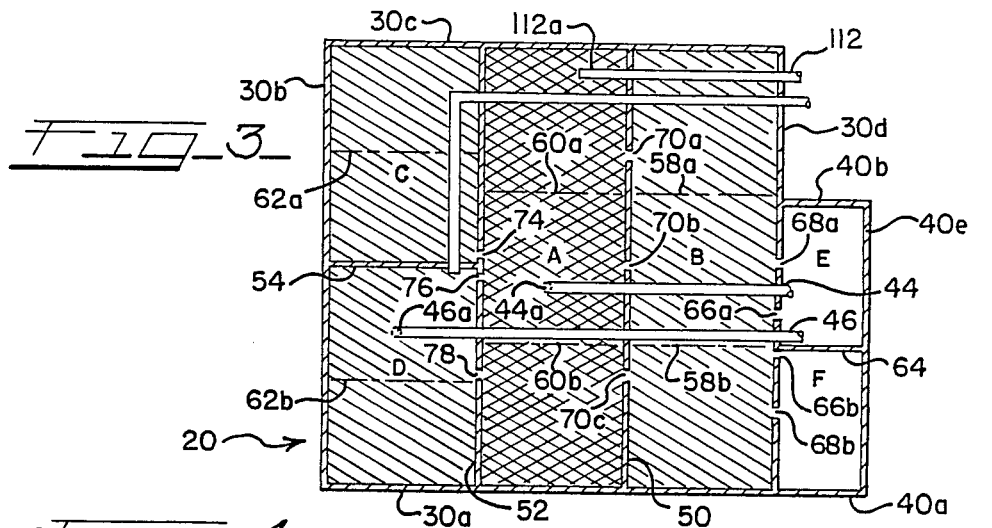
FIG. 3 is a generally horizontal plan view of the fluid tank of FIG. 2 but with the top wall removed to better illustrate various features of the invention.

Broadly stated, the present invention generally relates to a method and an apparatus for use in deicing aircraft, which apparatus is of the type that has a large capacity tank for holding deicing fluid and a fluid heater for heating the fluid to a predetermined temperature. As a result of a novel configuration of chambers within the tank, in combination with limited fluid flow capabilities between selected chambers, and the capability of transmitting fluid from a selected chamber through the heater to heat the fluid during initial heating of the fluid, there is a quantity of fluid heated to the required temperature available for deicing in a substantially shorter period of time than would be possible had the entire tank been heated to the desired temperature. Moreover, deicing can commence and the heater can continue to heat the fluid in the tank even as fluid is intermittently removed for deicing.

Referring now to the drawings, FIG. 1 illustrates an aircraft deicing apparatus in the form of a mobile vehicle or deicing truck, indicated generally at 10, which employs a deicing fluid tank or reservoir constructed in accordance with the present invention. The deicing truck 10 is, except for the particulars of the deicing fluid tank to be hereinafter more fully described, generally of the type commercially available from The Ted Trump Company of Elberta, Ala., as its model D-40 truck mounted deicer.

Briefly, the deicer includes a chassis (not shown) supported on forward and rearward sets of wheels, two of which are indicated at 12a and 12b, and has a cab 14 enabling operator control of the vehicle in a conventional manner. The deicer truck includes a generally rectangular truck body 16 which houses a deicer fluid tank or reservoir, indicated generally at 20, and supports an articulated boom 22 on its upper surface. The boom 22 carries a basket 24 on its outer end to support an operator. The truck body 16 further houses various operating components such as pumps, one fluid heater, and hydraulic and electrical lines and controls for selectively withdrawing deicing fluid from the reservoir 20 and conveying it to either a discharge nozzle (not shown) for spraying from the operator basket 24 or a discharge nozzle for spraying from ground level. A control panel 26 having control switches and operating levers and the like is preferably accessible on a side of the truck body 16 and defines a ground control station enabling operator control of the various deicing functions, including ground controlled operation of the boom 22. Suitable controls (not shown) are also preferably provided at the basket 24 to enable an operator supported within the basket to control movement of the boom 22 and discharge of deicer and/or anti-icing fluid from a discharge nozzle.

Referring now to FIGS. 2 and 3, the fluid tank or reservoir 20 is of generally rectangular configuration and has planar vertically disposed side walls 30a, 30b, 30c and 30d, a planar upper wall 32, and a lower or bottom wall defined by a pair of substantially equal area lower wall plates 34a and 34b which are inclined downwardly toward the longitudinal center of tank, it being understood that the forward and rear walls 30b and 30d have correspondingly configured lower edges so as to form a substantially closed fluid tank or reservoir. The tank 20 is preferably mounted on a frame having longitudinally extending frame members 36a, 36b and transverse frame members 36c, 36d which facilitate mounting of the tank on the deicer truck chassis The inclined lower walls 34a, 34b facilitate drainage of the reservoir through drain plugs (not shown) provided adjacent the longitudinal center of the tank.

The fluid tank 20 has a rearwardly extending fluid chamber 40 which is formed on the rearward tank wall 30d and includes laterally spaced side walls 40a,b, a planar top wall 40c, a generally V-shaped lower wall 40d, and a vertical rear wall 40e. The lower wall 40d is spaced upwardly from the lower tank walls 34a, 34b so as to expose a portion of wall 30d through which a fluid suction line or tube 44 and a glycol suction line 46 extend as will hereinafter be more fully described.

In the illustrated embodiment, the total fluid capacity of the tank or reservoir 20 is approximately 2,000 gallons. In accordance with an important feature of the present invention, the tank is divided into a plurality of discreet fluid retaining compartments or chambers by means of partition walls internally of the reservoir, which are in selective fluid communication with one another by means of a limited number of apertures. With particular reference to FIGS. 2 and 3, the portion of the tank bounded by walls 30a-d is divided into two substantially equal volume chambers A and B by transverse partition walls 50 and 52, which lie in vertical planes normal to the side walls 30a, 30c of tank 20, the partitions 50 and 52 being affixed along their peripheral edges in sealed relation to the corresponding walls of the reservoir. The partition wall 52 forms a common wall between chamber A and two generally equal volume compartments or chambers C and D which are separated from each other by a longitudinal vertical partition wall 54. Longitudinal vertically disposed baffles 58a and 58b extend between the rear tank wall 30d and transverse partition 50 to suppress lateral movement of fluid within chamber B, while similar vertically disposed baffles 60a and 60b provide a similar function within the chamber A. Similar vertical baffles 62a and 62b are disposed within the chambers C and D, respectively. The outwardly extending fluid chamber 40 is divided into two generally equal volume chambers or compartments E and F by a longitudinal vertically disposed partition wall 64.

The chambers E and F have restricted fluid communication with chamber B through circular openings 66a and 66b formed in the end wall 30d so as to intersect chambers E and F, respectively, generally adjacent the bottom wall 40d. The flow openings 66a and 66b are of a relatively small diameter, such as approximately 2 inch diameter, to restrict fluid flow between the chambers E and F, respectively, and chamber B, while enabling fluid heat convection between these chambers A pair of circular vent openings, indicated at 68a and 68b, are formed in the end wall 30d generally adjacent the upper wall 40c of chamber 40 to provide communication between the uppermost regions of chambers B, E and F The openings 68a, 68b are of relatively small diameter, such as 1.25 inch diameter, and enable equalization of the head pressure within chambers B, E and F and prevent vacuum heads from forming in chambers E and F during removal of fluid therefrom.

The partition wall 50 has a plurality of circular openings or passages therethrough which enable restricted fluid communication between chambers A and B. In the illustrated embodiment, three openings 70a, 70b and 70c of relatively small diameter, such as 2 inch diameter, are provided, which are preferably generally equidistantly spaced between the tank sidewalls 30a and 30c and are spaced upwardly approximately 7 inches from the inclined bottom tank walls 34a and 34b. The openings 70a-70c enable restricted fluid flow from chamber B to chamber A when fluid is removed from chamber A, and also facilitate fluid heat conduction between chambers A and B.

A 2-inch diameter opening 74 is formed in the partition wall 52 approximately 7 inches from the tank bottom wall and generally adjacent the longitudinal partition 54 to provide fluid communication between chambers C and A. An internally threaded opening 76 is formed in the partition 52 approximately 7 inches from the tank bottom wall 34a and on the opposite side of partition 54 from opening 74. The threaded opening 76 is adapted to receive a 2½ inch diameter removable plug and thus enables selective fluid communication between chambers A and D. A circular vent opening 78, which also may be of approximately 1.25 inch diameter, is preferably formed in the partition 52 approximately 2 inches below the top tank wall 32 and enables equalization of the pressure within the head spaces above fluid in chambers A and D and prevents vacuum lock within chamber D in the event fluid therein is allowed to flow into chamber A through the opening 76.

Referring to FIG. 2, a pair of fluid fill openings 82a and 82b are formed in the upper wall 40c of compartment 40 to facilitate filling of chambers E and F with a deicing fluid such as water. Each of the openings 82a, 82b is adapted for cooperation with a removable sealing cap, one of which is indicated at 84. The sealing caps 84 are accessible through the upper surface or wall 16a of the truck body 16. Each of the chambers A, B and D has a generally rectangular access opening, indicated at 86a, 86b and 86c, respectively, formed in the upper tank wall 32. Each access opening 86a-86c has an upstanding peripheral wall 88a, 88b and 88c, respectively, which extends upwardly through the truck body upper wall 16a and receives a corresponding rectangular lid, one of which is indicated at 90, to close off and seal the access opening. The access openings 86a-86c are preferably sized to enable an operator to enter the chambers A, B and D for maintenance, if necessary. The sealing lids 90 include means to allow venting of the upper regions of chambers A, B and D to atmosphere and thus prevent vacuum lock within the chambers during withdrawal of fluid therefrom.

As previously mentioned, the suction line 44 and suction line 46 extend outwardly or rearwardly from the tank end wall 30d below fluid compartment 40. The fluid suction line 44 passes through wall 30d and partition 50 in sealed relation therewith and has an inner fluid intake end 44a disposed within chamber A. The fluid suction line 44 is preferably spaced closely adjacent the bottom tank wall 34a, such as approximately 2 inches therefrom, proximate the longitudinal center of tank 20. Similarly, the suction line 46 passes in sealed relation through wall 30d and partitions 50 and 52 and has an intake end 46a disposed within chamber D, the suction line being similarly closely spaced from the bottom tank wall 34a. A conventional filter or strainer may be mounted on the intake ends 44a and 46a, of the suction lines 44 and 46, respectively, as indicated at 48a and 48b in FIG. 2.

In operation, the chambers A, B, C, E and F are initially filled with a deicing fluid, such as water or a mixture of water and glycol. Chamber D may be filled with glycol or a relatively high concentration glycol/water solution and may serve as an anti-icing fluid. This may be done if the "hot water" deicing method described in my U.S. Pat. No. 4,032,090 is utilized. If this method is utilized, then there should be no flow communication between chamber D and the chambers that contain only hot water. Chamber D would then be isolated by the use of plugs in the openings between chamber D and chambers adjacent to it. In preparing for a deicing operation, fluid is removed from chamber A through fluid suction line 44 by means of a pump, indicated schematically at 96 in FIG. 4, and passed through a heater 98 carried on the truck 10, such as a 2 million BTU/hr. heater, to heat the fluid to a temperature of approximately 140°-180° F. The temperature to which the deicing fluid is heated is a function of the temperature of the fluid that is introduced to the heater. After the fluid has been heated in the chamber A to a level of about 140° F., then when it passes through the heater again, for application onto an aircraft during a deicing operation, the fluid will be raised to the desired deicing temperature of 180 to 190 degree range. During initial heating of the fluid in the chamber A, the fluid will be pumped through the heater and returned to the chamber until the overall temperature reaches the minimum 140 degree level. Alternatively, the fluid may be heated to a temperature in the range of 195°-205° F. as established by temperature sensor flow controls 104a-104c connected in-line with heater 98. In practice, it may be preferable to maintain the temperature in the chamber A to a maximum temperature of about 140° F. so that degradation of the seals in the pump does not occur, which may be experienced for some pumps at a fluid temperature that exceeds about 140° F.

Figure 4:
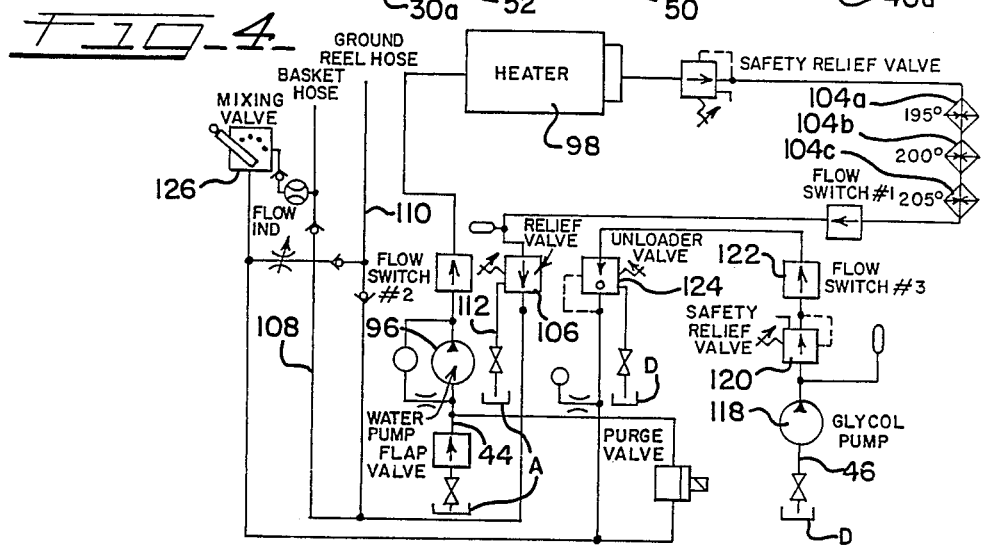
FIG. 4 is a schematic diagram of a deicing fluid control circuit for use with the fluid tank of FIG. 2.

As illustrated schematically in FIG. 4, fluid from the heater 98 is passed to a pressure relief valve 106 which has its outlet side connected through a flow conduit 108 to a nozzle (not shown) at the distal end of flow conduit 108. Conduit 108 extends along the length of the boom 22 to the operator basket 24 so as to enable operator control of the nozzle from the basket. Alternatively, the heated deicing fluid may be discharged through a nozzle (not shown) secured on the distal end of a flow conduit 110 which may be reel mounted for ground use. Each of the nozzles has a manually controllable discharge orifice which, when closed, causes heated fluid from the heater to be dumped by the pressure relief valve 106 for return to the tank chamber A through a fluid return line 112 which passes through the tank wall 30d and partition 50 in sealed relation therewith and has a discharge end 112a within chamber A. During initial heating of the fluid in chamber A, the discharge nozzles are initially maintained in closed conditions so that fluid from the chamber A is heated and returned to chamber A so as to bring substantially the full volume of fluid within chamber A to a temperature of at least approximately 140° F. Thereafter, opening of either the basket nozzle or ground nozzle effects withdrawal of fluid from chamber A and passage through the heater 98 to raise the temperature of the fluid to the desired temperature, normally in the upper range of 160°–180° F.

As the temperature of the heated fluid in chamber A is raised, it conducts heat through the partitions 50 and 52 to the fluid in chambers B and C and to the fluid in chamber D. Heat is also transmitted by convection through openings 70a–70c and 74. Depending upon the length of time the heated fluid is retained within chamber A, the temperature of the fluid in chambers B and C and the fluid in chamber D may be raised considerably from their initial temperatures. Depending upon the extent of heat energy transferred to the fluid within chamber B, heat may be conducted through wall 30d and openings 66a, 66b to the fluid in chambers E and F so as to raise its temperature.

As heated fluid is withdrawn from chamber A during a deicing operation, fluid from chambers B and C migrates to chamber A where it substantially replenishes the fluid withdrawn and is further preheated by admixture with the remaining heated fluid within chamber A. In this manner, the recovery time to again bring the fluid within chamber A to a desired temperature by means of the heater 98 will be relatively short.

When it is desired to apply an anti-icing fluid to an aircraft, glycol is withdrawn from chamber D through suction line 46 and passed through a glycol pump, as indicated schematically at 118 in FIG. 4, whereafter the glycol is passed through a pressure relief valve 120, a flow control switch 122 and an unloader valve 124. The unloader valve 124 is connected to a mixing valve 126 operative to selectively pass glycol to line 108 for discharge from the nozzle at the operator basket 24 or, alternatively, pass glycol to line 110 for discharge from a ground controlled nozzle. In either case, the glycol may be sprayed as received from chamber D or as mixed with fluid from chamber A.

Figure 5:
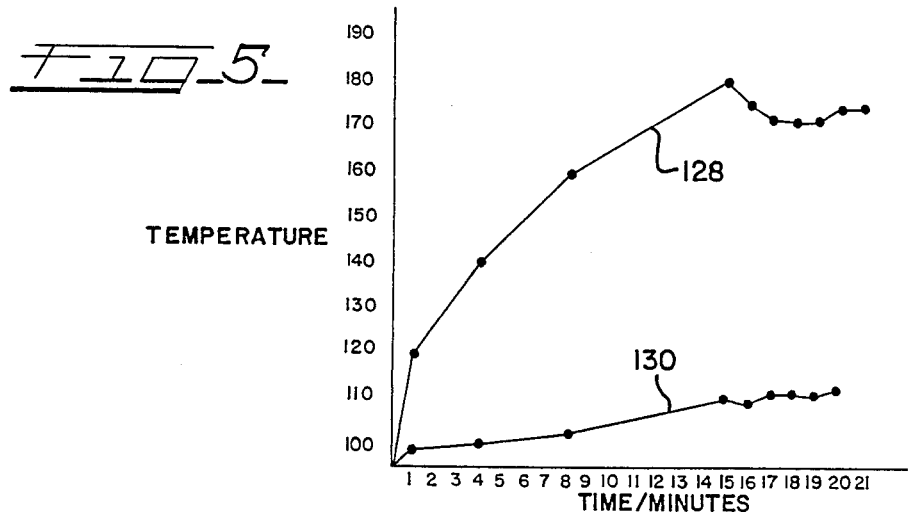
FIG. 5 is a graph illustrating the time-temperature characteristics for heating the deicing fluid in accordance with the present invention as compared to prior deicing fluid heating methods.

In accordance with an important aspect of the present invention, by isolating a predetermined quantity of deicing fluid within the tank 20 from the remaining deicing fluid, the isolated deicing fluid may be withdrawn and heated to a desired deicing temperature in a substantially reduced period of time over prior deicing apparatus which heat the full volume of deicing fluid within the deicing truck tank. For example, a fluid tank 20 having a volumetric capacity of approximately 2,000 gallons, of which chamber D has an approximate 300 gallon glycol capacity, leaves a fluid storage capacity of approximately 1700 gallons for chambers A, B, C, E and F, collectively. If chamber A is sized to receive approximately 600 gallons of fluid, it has been found that the fluid in chamber A may be brought to a desired temperature, such as about 180° F., in approximately 15 minutes. This is graphically illustrated in FIG. 5 which shows a time-temperature curve 128 for heating the full complement of fluid within chamber A to a temperature of approximately 180° F. On the other hand, prior aircraft deicing systems which heat the full volume of deicing fluid within the truck tank, and again assuming a deicer fluid volumetric capacity of approximately 1700 gallons, have resulted in a time-temperature curve as indicated at 130. FIG. 5 thus illustrates that by isolating a selected portion of the deicing fluid within tank 20, such as chamber A, for heating, a deicing temperature of 180° F. may be reached in approximately 15 minutes. This compares very favorably with prior deicing apparatus where a deicing fluid temperature of only approximately 110° F. is reached in a 15 minute period for the same BTU rated heater. Thus, it is seen that the present invention provides a substantial reduction in the time required to raise the temperature of the deicing fluid to a desired temperature as compared with prior deicing apparatus.

While a preferred embodiment of the present invention has been illustrated and described it will be understood that changes and modifications may be made therein without departing from the invention in its broader aspects.

Various features of the invention are defined in the following claims.

What is claimed is:

1. In an apparatus for deicing aircraft or the like, which apparatus includes a reservoir of predetermined volume for containing a supply of deicing fluid, heating means, means operative to withdraw deicing fluid from said reservoir and effect passage through said heating means, and application means operative to enable selective application of heated deicing fluid onto an aircraft; the improvement wherein said reservoir includes partition means establishing at least two chambers for retaining deicing fluid such that the volume of deicing fluid in each chamber is substantially less than said predetermined volume and is generally isolated from fluid in the other chamber, said deicing fluid withdrawing means being operative to withdraw fluid directly from a selected one of said chambers for passage through said heating means and return directly to said selected one of said chambers, said application means being connected in flow communication with said selected one of said chambers so as to withdraw heated deicing fluid therefrom during deicing of an aircraft surface, said partition means being operative to enable restricted flow of deicing fluid from the other of said chambers into said selected one of said chambers so as to substantially replenish the heated deicing fluid removed therefrom by said application means without substantially reducing the temperature of deicing fluid remaining in said selected chamber.

2. Apparatus as defined in claim 1 wherein said partition means defines at least one chamber for receiving an anti-icing fluid, and including means enabling withdrawal of said anti-icing fluid for application onto an aircraft.

3. Apparatus as defined in claim 1 wherein said partition means includes a plurality of partition walls defining a plurality of deicing fluid chambers each of which has a volumetric capacity substantially less than one-half said predetermined volume, said deicing fluid withdrawing means being operatively associated with a selected one of said chambers, and said partition means enabling restricted fluid flow from the other of said chambers into said selected one of said chambers upon withdrawing fluid therefrom.

4. Apparatus as defined in claim 3 wherein said partition walls bounding said selected one of said chambers include passages therethrough enabling restricted fluid flow from the other of said chambers into said selected one of said chambers upon withdrawal of fluid therefrom.

5. Apparatus as defined in claim 4 wherein said partition walls are substantially vertical, said passages therethrough being formed generally adjacent the lower edges of said partition walls.

6. Apparatus as defined in claim 4 wherein said reservoir further includes baffle means within said chambers to restrict lateral movement of fluid therein 7. Apparatus as defined in claim 5 including vent means operatively associated with the upper region of each of said chambers so as to prevent vacuum lock therein during withdrawal of fluid from said reservoir.

8. Apparatus adapted for deicing aircraft using heated deicing fluid comprising, in combination, a fluid tank, wall means within said tank defining a plurality of chambers for receiving deicing fluid, means for withdrawing deicing fluid directly from a selected one of the chambers, means for heating said withdrawn fluid to a predetermined temperature and selectively returning the heated fluid directly to said selected chamber, said wall means including means enabling restricted fluid flow communication between the various deicing fluid chambers, said means for enabling restricted fluid flow between the various chambers enabling deicer fluid in said adjacent chambers to replenish the fluid removed from said selected chamber without substantially reducing the temperature of the fluid therein, the temperature of the deicing fluid in adjacent chambers being raised by conductive heating from said selected chamber and by convective heating by the limited flow between said various adjacent chambers, said selected one of the chambers thereby having a temperature-ready supply of deicing fluid for deicing aircraft before the fluid of the other of the chamber is heated to said predetermined temperature.

9. Apparatus as defined in claim 8 wherein said tank is bounded by peripheral side walls, a top wall and a bottom wall, said partition wall means including a plurality of generally vertical partition walls affixed at their peripheral edges to corresponding ones of said peripheral tank walls, said partition walls having passages therethrough enabling restricted fluid flow into said selected one of said chambers from the other of said deicing fluid chambers.

10. Apparatus as defined in claim 9 wherein said passages enabling restricted fluid flow between said deicing fluid chambers are formed generally adjacent the lower edges of said partition walls, and including vent passages formed in said partition walls generally adjacent their upper edges to enable communication between the upper regions of said chambers as fluid is withdrawn therefrom.

11. A method for deicing aircraft and the like comprising the steps of;
 filling a reservoir of predetermined volume with a deicing fluid,
 isolating a portion of said deicing fluid from the remainder of said deicing fluid within said reservoir,
 heating said isolated portion of said deicing fluid to a predetermined temperature,
 removing at least a portion of said heated deicing fluid directly from said isolated portion during deicing operation,
 returning said portion of said heated deicing fluid directly to said isolated portion,
 and effecting restricted flow of deicing fluid from the remainder of said deicing fluid into said isolated deicing fluid so as to replenish the withdrawn deicing fluid and preheat said replenishing deicing fluid whereby to reduce the time required to maintain said isolated deicing fluid at said predetermined deicing temperature.

12. The method as defined in claim 11 wherein said step of heating said isolated portion of said deicing fluid comprises withdrawing deicing fluid from said isolated portion of said deicing fluid and passing said withdrawn deicing fluid through a heater to raise it to said predetermined temperature, and returning said heated deicing fluid to said isolated portion of fluid within said reservoir.

13. The method as defined in claim 12 wherein said step of isolating a portion of said deicing fluid includes forming a plurality of partition walls within said reservoir so as to establish a plurality of chambers to receive deicing fluid therein, said partition walls having passages therethrough to enable said restricted flow of deicing fluid into a selected one of said chambers from the other of said deicing fluid chambers during withdrawal of fluid from said selected one of said chambers.

14. A method for heating deicing fluid in an apparatus for deicing aircraft and the like comprising the steps of:
 filling a reservoir of predetermined volume with a deicing fluid, the reservoir being of the type which has at least three chambers in which the deicing fluid is contained, with the chambers being in fluid communication with one another by restricted flow means located therebetween;
 circulating the fluid directly from a selected one of said chambers through a heating means to heat the fluid passing through said heating means and returning the fluid directly to said selected chamber, to thereby rapidly bring the temperature of the fluid in said selected chamber to a predetermined temperature;
 removing heated deicing fluid from said selected chamber for application on an aircraft during a deicing operation, the removal of fluid from said selected chamber causing flow of deicing fluid from adjacent chambers into said selected chamber to replenish the fluid removed from said selected chamber; and,
 circulating the fluid from said selected one of said chambers through said heating means and returning the fluid to said selected chamber to bring the temperature of the fluid in said selected chamber to said predetermined temperature.

* * * * *